United States Patent [19]

Immel et al.

[11] 3,882,102

[45] May 6, 1975

[54] PROCESS FOR THE PURIFICATION OF CAPROLACTAM

[75] Inventors: Otto Immel; Hans-Helmut Schwarz, both of Krefeld, Germany

[73] Assignee: Bayer Aktiengesellschaft, Leverkusen, Germany

[22] Filed: Oct. 24, 1973

[21] Appl. No.: 409,046

Related U.S. Application Data

[63] Continuation of Ser. No. 197,514, Nov. 10, 1971.

[52] U.S. Cl................................................ 260/239.3 A
[51] Int. Cl............................................... C07d 41/06
[58] Field of Search.............................. 260/239.3 A

[56] References Cited
UNITED STATES PATENTS

| | | | |
|---|---|---|---|
| 2,221,369 | 11/1940 | Cass | 260/239.3 A |
| 2,313,026 | 3/1943 | Schlack | 260/239.3 A |
| 2,988,546 | 6/1961 | Lippincott et al. | 260/239.3 A |
| 3,145,198 | 8/1964 | Morbidelli et al. | 260/239.3 A |
| 3,359,260 | 12/1967 | Roberts et al. | 260/239.3 A |
| 3,485,820 | 12/1969 | Hofmann et al. | 260/239.3 A |

FOREIGN PATENTS OR APPLICATIONS

| | | | |
|---|---|---|---|
| 837,070 | 6/1960 | United Kingdom | 260/239.3 |

*Primary Examiner*—Henry R. Jiles
*Assistant Examiner*—Robert T. Bond
*Attorney, Agent, or Firm*—Plumley & Tyner

[57] ABSTRACT

The invention relates to a process for the purification of caprolactam which is obtained by rearrangement of cyclohexanone oxime in the gas phase in the presence of solid catalysts. The purification takes place by dissolving the crude lactam in benzene or in alkyl benzene with seven to eight carbon atoms and recrystallization whilst cooling.

4 Claims, No Drawings

PROCESS FOR THE PURIFICATION OF CAPROLACTAM

This is a continuation of application, Ser. No. 197,514 filed Nov. 10, 1971.

The invention relates to a crystallization process for the purification of caprolactam, which is obtained by rearrangement of cyclohexanone oxime in the presence of solid catalysts.

It is known that caprolactam of very high purity is required for the production of polyamides which are processed, for example, to synthetic fibres. A large number of papers and patents deal with the purification of lactams. The known methods of purification have considerable drawbacks, e.g. vacuum distillation possibly with additives or the extraction from organic solvents. Attempts have therefore been made to improve these purification methods by conducting the lactam solutions through ionic exchangers or by treating them with adsorption agents, such as, for example, active charcoal or calcium silicate, or by subjecting them to hydrogenation or even an oxidation reaction. Crystallization was proposed as another purification process, this being carried out in water or in low-boiling aliphatic hydrocarbons with low dissolving capacity for lactam. These methods of crystallization are usually not sufficient for the purification of the lactam and have to be additionally combined with other purification processes: always necessary is, for example, a chemical treatment, an extraction or a rectification.

Hitherto the crystallization methods for the purification of caprolactam could not be rated in practice as equal to the processes of extraction and distillation (Kalab, Chem. puml. r. 19/44, 1969, 4.,Pg.62–166). The purification processes by crystallization of caprolactum from aqueous solutions (U.S. Pat. No. 2,813,858), from liquid ammonia (French Pat. No. 1,410,256) and from different organic solvents (French Pat. No. 1,490,312) have been taken into consideration.

According to the U.S. Pat. No. 2,813,858, caprolactam can be purified by crystallization if a substance is added to it which is soluble in lactam and lowers the solidification point of the lactam. A plurality of such substances can be listed, such as water, ammonia, cyclohexane, benzene, some ketones, some alcohols, some chlorohydrocarbons and —generally— aliphatic and aromatic hydrocarbons. However, of these compounds those are to be particularly preferred whose molecular weight is below 50, e.g. water and ammonia.

According to the French Pat. No. 1,490,312 other solvents are proposed for the purification of caprolactam, for example a certain number of esters of monocarbonic acids, a selection of aliphatic ketones and finally monoalkylbenzene and dialkylbenzene compounds with eight to 10 carbon atoms in the molecule. This patent discloses that there is a series of technically feasible purification processes, which however were especially developed for lactam from the Beckmann rearrangement. Lactams which were prepared in another way, e.g. by hydrolysis of ω-aminocaproic acid nitrile, according to the Schmidt reaction or by ammonolysis of ω-caprolacton, contain other accompanying substances as impurities depending on their manner of preparation and each lactam therefore requires a special kind of purification. A purification process for lactam prepared by ring-closing saponification of ω-aminocaproic acid nitrile, is to be found for example in the German Pat. No. 924,213. A process for the purification of caprolactam from ε-caprolacton is described in the above-mentioned French Pat. No. 1,420,256. For the purification of caprolactam which is gained by photo-oximation and rearrangement of cyclohexanone oxime, treatment with zinc was recommended according to the German Auslegeschrift No. 1,263,772. Thus, the known crystallization methods are scarcely used in the art.

Furthermore, it was known that the type of impurity depends on the process for preparing caprolactam and that every process for preparing lactam hence necessitates a particular lactam purification process. It is true that it is stated in the German Auslegeschrift No. 1,155,132 that the lactam prepared by catalytic rearrangement is purified in the usual way. In this instance, the purification process was obviously very costly and unsatisfactory. As a measure for the grade of purity only the permanganate numbers (350–510) are given. However, it is generally known that several characteristic data are decisive for the quality of the lactam.

In the crude lactam which is obtained by catalytic rearrangement of cyclohexanone oxime, the following substances are to be reckoned on as impurities: cyclohexanone, cyclohexanol, cyclohexanone oxime, various hexenoic acid nitriles, cracking products and compounds containing boron (when using a borontrioxide catalyst).

The preparation of lactam by catalytic rearrangement in the gas phase (e.g. according to the German Auslegeschrift No. 1,055,537) would gain great technical importance over the Beckmann rearrangement, if the purification of the lactam prepared by means of catalysts could be carried out in a simple way: for this reason such a method of purification was sought.

Surprisingly, it has now been found that caprolactam, which was produced from cyclohexanone oxime by catalytic rearrangement in the gas phase, crystallizes out of simple aromatic hydrocarbons, such as benzene, toluene, or xylene, with unusually high purity. In addition to the by-products produced during catalytic rearrangement, the lactam to be purified can contain some oxime which originates, for example, from an incomplete rearrangement reaction. In particular, the possibility offered by the process according to the invention, namely of purifying oxime-containing lactam by means of simple crystallization, means a significant advance to the art, since the removal of the last traces by oxime by distillation or extraction is not easy to achieve.

Accordingly, the present invention relates to a process for the purification by crystallization from organic solvents of ε-caprolactam, in particular of ε-caprolactam obtained by rearrangement at elevated temperatures in the presence of catalysts containing borontrioxide, characterized in that the crude lactam is dissolved in benzene or in an alkyl benzene with seven to eight carbon atoms, in that the ε-caprolactam is precipitated at about 0° to 50°C whilst stirring and cooling, in that the crystal sludge is filtered, optionally after repeated recrystallization from benzene or alkyl benzenes having 7 to 8 carbon atoms and finally in that the so treated ε-caprolactam is distilled under vacuum.

In the technical process for carrying out the Beckmann rearrangement, a large excess of acid is employed in order to achieve with certainty a complete rearrangement of oxime. When using the new purification process, this excess of acid is no longer necessary. The new process is also suitable for the purification of lactams which are recovered by depolymerisation of polyamide waste products (cracked lactam). The purification process according to the invention is particularly suitable for the purification of ε-caprolactam, but it can also serve to purify other lactams which are derived for example from the ω-aminovaleric acid, from the ω-aminocaprylic acid, from the ω-aminoundecanoic acid or from the ω-aminolauric acid.

The purification process according to the invention can be carried out, for example, as follows:

10 to 60 parts by weight of benzene or toluene are mixed with 100 parts by weight of crude lactam and dissolved by heating. The solution is then slowly cooled to 0° to 50°C with stirring and the lactam crystallizes out. The lactam, for example, in twice the amount, can however also be dissolved in toluene and supersaturation of the lactam solution induced by evaporation of the toluene. The mother liquid is separated in the usual way by filtration and the crystals are washed with a little cold solvent. A solvent with low dissolving capacity for lactam, such as for example cyclohexane or benzine may possibly be used for washing the crystals. If the lactam contains a great number of impurities, it is advisable to recrystallize the lactam twice or several times in the aromatic hydrocarbon. When continuously carrying out the process, the mother liquors of the individual crystallization stages can be recycled to the preceding crystallization stage. The impurities are removed in that the mother liquor from the first crystallization stage is substantially concentrated by means of distillation, so that upon cooling, the greater part of the lactam precipitates. This lactam is separated off and recycled to the first crystallization stage. The solvent is recovered from the remaining mother liquor by distillation. The residue is fractionally distilled under vacuum in order to separate a part of the impurification products from the lactam.

The lactam can likewise be recycled to the first crystallization stage. It is advisable to distill the purified lactam from the last crystallization stage by adding a little water, in order to remove the last traces of the solvent originating from the recrystallization. The following examples are intended to illustrate the described process and to show the high degree of purification to be achieved herewith.

To determine the degree of purity of the caprolactam, the customary characteristic data was measured. The Hazen colour number is defined according to ASTM, D 1209. The permanganate number gives the time in seconds after which the colour of a solution of 1 g ω-caprolactam in 100 ml of water has become so weak after addition of 1 ml of a N/100 KMnO$_4$ solution that the colour corresponds to a comparison solution which contains 2.5 g Co(NO$_3$)$_2$ . 6 H$_2$O and 0.01 g K$_2$Cr$_2$O$_7$ in 1 litre of water.

EXAMPLE 1

2,000 parts by weight of crude lactam, which are produced by rearrangement of cyclohexanone oxime in the gas phase in the presence of a borontrioxide catalyst, are dissolved in 300 parts by weight of toluene with heating. The crude lactam contains 5 % of cyclohexanone oxime and about 2 % of byproducts. The dark-brown lactam solution is slowly cooled to 40°C. The resulting crystal sludge is filtered off by suction and recrystallization two more times in the same manner each time with 150 parts by weight of toluene. After the second and third recrystallization, the lactam crystals are washed each time with 150 parts by weight of toluene. The yield of caprolactam is 600 parts by weight. The remaining caprolactam stays in the mother liquors and washing liquors. The liquors from the second and third crystallisation stage are used for the recrystallisation of further crude lactam. The recrystallised caprolactam was distilled at 0.2 – 0.8 Torr. The caprolactum thus purified had the following purity identifying numbers (column 2):

| Solidification point | 69.10 °C | 69.10 °C |
|---|---|---|
| Hazen colour number | 5 | 5 |
| Volatile bases | 0.07 | 0.09 |
| UV number | 97 | 96 |
| Permanganate number | >40 000 | >40 000 |

In the last column of this Table, the characteristic data is given for caprolactam which is obtained on purification of additional crude lactam with the use of the above-mentioned washing liquors and mother liquors from the second and third crystallization stage.

EXAMPLE 2

Caprolactam, which is produced by catalytic rearrangement of cyclohexanone oxime in the presence of borontrioxide catalyst, is distilled at a pressure of 1 Torr in order to, above all, free it from mechanical impurities.

1,425 parts by weight of the prepurified caprolactam are mixed with 347 parts by weight toluene and dissolved by heating. A bright yellow solution is produced which is cooled to about 10°C. The greater part of the lactam crystallizes. The crystals are separated off, rinsed with a little toluene and recrystallized for a second time in 260 parts by weight of toluene. The filtered lactam crystals are first washed with toluene and finally with cyclohexane and dried. In this way 930 parts by weight of pure caprolactam are obtained. The mother liquors in which the remaining caprolactam is dissolved are used for the purification of additional crude lactam. Thereafter the lactam is distilled under vacuum.

The purified caprolactam had the following analytical characteristics:

| Solidification point | 69.08 °C |
|---|---|
| Hazen colour number | 5 |
| Volatile bases | 0.08 |
| UV number | 98 |
| Permanganate number | >40 000 |

EXAMPLE 3

1,000 parts by weight of caprolactam, which are produced by the Beckmann rearrangement is sulphuric acid and contain 3.5 % of water in addition to slight impurities, are mixed with 300 parts by weight toluene and dissolved by heating. The lactam solution is cooled with stirring during which the greater part of the lactam crystallizes. The crystals are filtered off by suction, rinsed with a little toluene and dried. 565 parts by weight of caprolactam are obtained. The remainder stays in the mother liquor and can be used for the purification of further crude lactam. Thereafter the lactam is distilled at 0.5 Torr. From the caprolactam thus obtained the following characteristic data is determined:

| | |
|---|---|
| Solidification point | 69.08 °C |
| Hazen colour number | 5 |
| Volatile bases | 0.09 |
| UV number | 98 |
| Permanganate number | >40 000 |

EXAMPLE 4

1,000 parts by weight of caprolactam which come from depolymerisation of polyamide waste and are prepurified by distillation are mixed with 300 parts by weight of toluene and dissolved by heating. The yellow-coloured caprolactam solution is cooled to 10°C, the crystallized caprolactam is filtered off by suction and washed with 300 parts by weight of cold caprolactam. 891 parts by weight of moist caprolactam are obtained. The lactam is distilled at 0.5 Torr. The caprolactam thus obtained has the following characteristic data (column 2):

| | | |
|---|---|---|
| Solidification point | 69.07 °C | 69.1 °C |
| Hazen colour number | 10 | 10 |
| Volatile bases | 0.07 | 0.02 |
| UV number | 73 | 99 |
| Permanganate number | 24 000 | >40 000 |

The other part of the recrystallized caprolactam is recrystallized for a second time in toluene and just as the first part is treated with water vapour and distilled. The resulting caprolactam is of high quality, as shown by the characteristic data which appears in the last column of the Table.

EXAMPLE 5

1,000 parts by weight of crude lactam, which are prepared by catalytic rearrangement of cyclohexanone oxime in the presence of a borontrioxide catalyst, are dissolved in 300 parts by weight of o-xylene whilst heating. The dark-brown solution is cooled to about 10°C whilst stirring. The crystals are separated off, washed with a little o-xylene and recrystallized two more times in the same way in oxylene and washed. The yield of recrystallized caprolactam is 419 parts by weight. The recrystallized caprolactam is distilled at 0.5 Torr. The characteristic data of the caprolactam thus purified is as follows:

| | |
|---|---|
| Solidification point | 69.10 °C |
| Hazen colour number | 10 |
| Volatile bases | 0.12 |
| UV number | 99 |
| Permanganate number | >40 000 |

EXAMPLE 6

1,000 parts by weight of prepurified caprolactam — the same quality as in Example 2 — are twice recrystallized in 300 parts by weight of benzene. The lactam crystals which are separated from the mother liquor are washed with benzene and finally with cyclohexane. 519 parts by weight of caprolactam can be obtained in this way. After treatment with water vapour and subsequent distillation, as in Example 3, the purified caprolactam has the following characteristic data:

| | |
|---|---|
| Solidification point | 69.04 °C |
| Hazen colour number | 5 |
| Volatile bases | 0.04 |
| UV number | 96 |
| Permanganate number | >30 000 |

1. A process for the treatment of the crude product resulting from the catalytic rearrangement of cyclohexanone oxime, in the gas phase, to ε-caprolactam in the presence of a boron trioxide-containing catalyst which comprises the steps of:
   a. dissolving said crude produce in benzene or an alkyl benzene having seven to eight carbon atoms;
   b. stirring and cooling said solution and precipitating ε-caprolactam at about 0° to 50°C;
   c. filtering the resultant crystal sludge from said solution; and
   d. recovering substantially pure ε-caprolactam by vacuum distillation.

2. The process of claim 1 in which said crude product is dissolved in toluene.

3. The process of claim 1 in which said crude product is dissolved in xylene.

4. In the process of purifying crude ε-caprolactam prepared by the rearrangement of cyclohexanone oxime in the gas phase in the presence of solid catalyst; the improvement comprising recrystallizing the crude ε-caprolactam in benzene or an alkyl benzene having seven to eight carbon atoms.

* * * * *